United States Patent [19]
Ho et al.

[11] Patent Number: 5,831,138
[45] Date of Patent: Nov. 3, 1998

[54] DISPERSED METAL SULFIDE CATALYSTS FOR HYDROPROCESSING

[75] Inventors: Teh Chung Ho, Bridgewater; Stuart Leon Soled; Sabato Miseo, both of Pittstown; Gary Brice McVicker, Califon, all of N.J.; Michel Daage, Baton Rouge, La.; Viktor Buchholz, Branchburg, N.J.

[73] Assignee: Exxon Research and Engineering Company, Florham Park, N.J.

[21] Appl. No.: 912,895

[22] Filed: Aug. 15, 1997

Related U.S. Application Data

[60] Division of Ser. No. 524,228, Sep. 5, 1995, Pat. No. 5,728,644, which is a continuation-in-part of Ser. No. 273,664, Jul. 12, 1994, abandoned.

[51] Int. Cl.$^6$ ........................................ C07C 5/10
[52] U.S. Cl. ...................... 585/270; 585/269; 585/274; 585/276; 208/143
[58] Field of Search .................... 208/143; 585/266, 585/269, 277, 270, 274, 275, 276

[56] References Cited

U.S. PATENT DOCUMENTS

| | | | |
|---|---|---|---|
| 4,202,758 | 5/1980 | O'Hara et al. | 208/143 |
| 4,595,672 | 6/1986 | Ho et al. | 502/219 |
| 5,254,518 | 10/1993 | Soled et al. | 502/241 |

*Primary Examiner*—Bekir L. Yildirim
*Attorney, Agent, or Firm*—Estelle C. Bakun

[57] ABSTRACT

The present invention is directed toward a catalyst composition comprising a catalyst prepared by a process comprising: (a) impregnating an oxide precursor selected from the group consisting of rare earth oxide precursors, yttria precursors and mixtures thereof, onto an inorganic refractory oxide support; (b) drying said support at a temperature of about 100° to about 120° C. followed by calcining said support at a temperature of about 400° to about 600° C.; and (c) compositing or depositing on said support of step (b), a catalyst precursor salt represented by $(ML)(Mo_yW_{1-y}O_4)_a$ wherein M comprises Cr and/or one or more divalent promoter metals selected from the group consisting of Mn, Fe, Co, Ni, Cu, Zn and mixtures thereof, wherein y is any value ranging from 0 to 1, and wherein L is one or more neutral, nitrogen-containing ligands at least one of which is a chelating polydentate ligand; a=1 when chromium is not one of the promoter metals and $0.5 \leq a \leq 3$ when Cr is one of the promoter metals. (d) sulfiding said deposited or composited supports of step (c) with an excess amount of sulfur in the form of one or more sulfur bearing compounds and at a temperature of at least about 250° C. to form catalysts. In a preferred embodiment, the process will further comprise decomposing the composited or deposited supports of step (c) in a nonoxidizing atmosphere at a temperature of at least about 250° C. prior to said sulfiding step (d). In a second aspect of the invention there is provided an improved aromatics hydrogenation process.

2 Claims, No Drawings

DISPERSED METAL SULFIDE CATALYSTS FOR HYDROPROCESSING

This is a division of application Ser. No. 524,228, filed Sep. 5, 1995, now U.S. Pat. No. 5,728,644 which is a continuation-in-part of U.S. Ser. No. 273,664 filed Jul. 12, 1994, now abandoned.

FIELD OF THE INVENTION

The present invention is directed toward improved supported transition metal sulfides prepared from metal amine molybdates and tungstates and their use for aromatics hydrogenation reactions.

BACKGROUND OF THE INVENTION

Aromatics hydrogenation is an integral part of many processes for manufacturing chemicals (e.g. solvents) and lubes (e.g. for viscosity index improvement). It is also a critical step in fuels refining. Currently, environmental regulations call for a significant reduction in the aromatics content of middle distillates. Low surface area bulk sulfides prepared from metal amine molybdates have been utilized in hydrotreating processes in which the primary processing objective is to remove heteroatoms from the feed (e.g. U.S. Pat. No. 4,595,672 to Ho et al). What is needed in the art is a catalyst composition which affords increased performance and greater metal utilization in an aromatics hydrogenation process.

SUMMARY OF THE INVENTION

Applicants have unexpectedly discovered that metal amine molybdate (MAM) or metal amine tungstate (MAT) sulfided catalysts supported on an yttrium or a rare earth oxide modified inorganic refractory oxide such as silica, silica-alumina, zirconia, titania, alumina and mixtures thereof are highly active for aromatics hydrogenation.

Hence, one aspect of the present invention is directed toward a catalyst composition comprising a catalyst prepared by a process comprising:

(a) impregnating an oxide precursor selected from the group consisting of rare earth oxide precursors, yttria precursors and mixtures thereof, onto an inorganic refractory oxide support;

(b) activating said support; and (c) compositing or depositing on said support of step (b), a catalyst precursor salt represented by $(ML)(Mo_yW_{1-y}O_4)_a$ wherein M comprises Cr and/or one or more divalent promoter metals selected from the group consisting of Mn, Fe, Co, Ni, Cu, Zn and mixtures thereof, wherein y is any value ranging from 0 to 1, and wherein L is one or more neutral, nitrogen-containing ligands at least one of which is a chelating polydentate ligand; a=1 when chromium is not one of the promoter metals and $0.5 \leq a \leq 3$ when Cr is one of the promoter metals.

(d) sulfiding said deposited or composited supports of step (c) with an excess amount of sulfur in the form of one or more sulfur bearing compounds and at a temperature of at least about 250° C. to form catalysts.

In a preferred embodiment, the process will further comprise decomposing the composited or deposited supports of step (c) in a nonoxidizing atmosphere at a temperature of at least about 250° C. prior to said sulfiding step (d).

In a second aspect of the invention there is provided an improved aromatics hydrogenation process which process comprises contacting an aromatics hydrogenation feedstream with a catalyst composition prepared by a process comprising:

(a) impregnating an oxide precursor selected from the group consisting of rare earth oxide precursors, yttria precursors, and mixtures thereof, onto an inorganic refractory oxide support;

(b) activating said support; and (c) compositing or depositing on said support of step (b), a catalyst precursor salt represented by $(ML)(Mo_yW_{1-y}O_4)_a$ wherein M comprises Cr and/or one or more divalent promoter metals selected from the group consisting of Mn, Fe, Co, Ni, Cu, Zn and mixtures thereof, wherein y is any value ranging from 0 to 1, and wherein L is one or more neutral, nitrogen-containing ligands at least one of which is a chelating polydentate ligand; a=1 when chromium is not one of the promoter metals and $0.5 \leq a \leq 3$ when Cr is one of the promoter metals.

(d) sulfiding said deposited or composited supports of step (c) with an excess amount of sulfur in the form of one or more sulfur bearing compounds and at a temperature of at least about 250° C. to form catalysts.

Preferably, the process will further comprise decomposing the composited or deposited supports of step (c) in a nonoxidizing atmosphere at a temperature of at least about 250° C. prior to said sulfiding step (d).

DETAILED DESCRIPTION OF THE INVENTION

Applicants have discovered that modifying an inorganic support with a rare earth oxide or yttria provides a greatly improved support for deposition of metal amine molybdates or tungstates. The resulting materials upon sulfiding are highly active catalysts for aromatics hydrogenation.

In accordance with the instant invention, the support may be selected from any inorganic refractory oxide such as zirconia, titania, magnesia, silica, alumina, silica-alumina and mixtures thereof. All such supports are readily obtainable. The support may be calcined in air at a temperature ranging from about 400° to about 600° C. prior to any addition of oxide or metal amine metallates. The support is modified with an oxide of yttrium or a rare earth element. Rare earth elements are those elements of the periodic table having atomic numbers of 58 through 71 inclusive. Preferred are neodymium and erbium oxides. Such oxides will be present on the support in an amount ranging from 2 to 30 wt %, more preferably 4 to 20 wt %. Impregnation of the oxide onto the support can be carried out by any means known to those skilled in the art. Typically, the rare earth oxide or yttria is added to the support in the form of a hydrated salt, e.g., $Nd(NO_3)_3 \cdot 6H_2O$ when the rare earth metal is Nd. Once the support is activated, hydrated salt converts to the oxide. Activation comprises drying the support followed by calcination. Preferably, the support will be dried between about 90° to about 200° C., preferably 100 to about 150° C., more preferably about 100° to 120° C., followed by calcination between about 300° and 900° C., preferably about 400° to about 600° C. for about 1 to 24 hours, preferably about 4 hours).

The support will also contain a metal amine metallate deposited thereon. The metal amine metallate is converted to the sulfide by sulfiding the catalyst in the presence of excess sulfur in a non-oxidizing atmosphere at a temperature of at least about 250° C. Deposition of the metal amine metallate is accomplished by precipitating the metal amine metallate with the modified support. As used herein, metal amine metallates include both metal amine molybdates, metal amine tungstates and mixtures thereof.

The catalyst of the instant invention can be referred to as $M(Mo_yW_{1-y})_aS_x$ deposited or composited on an yttrium or rare earth oxide modified support. In this formula M is Cr and/or one or more divalent promoter metals selected from the group consisting of Mn, Fe, Co, Ni, Cu, and Zn; x is a number from 0.5 to 9 and more preferably from 1 to 5; a=1 when Cr is not one of the metals represented by M and $0.5 < a \leq 3$ or more preferably $0.8 \leq a \leq 2$ when Cr is one of the metals represented by M, with or without another promoter metal. The catalyst is derived from the precursor represented by $ML(Mo_yW_{1-y}O_4)_a$ where M is as defined above; L is one or more neutral, nitrogen-containing ligands at least one of which is a chelating polydentate ligand; $0 \leq y \leq 1$; and a is defined as above. The preparation of the catalyst precursor has been detailed in U.S. Pat. Nos. 4,595,672; 4,902,404; and 4,831,002 herein incorporated by reference and described herein.

Preferably, M will be selected from the group consisting of (a) Ni, Co, Fe and mixtures thereof, and (b) mixtures of (a) with Zn, Cu, Mn and Cr. Still more preferably M will be selected from the group consisting of Fe, Mn, Ni, Co, Cr and mixtures thereof. Thus, the promoter metal may be a single metal such as Ni, in which case the precursor will have the formula $(NiL)(Mo_yW_{1-y}O_4)$. Alternatively the promoter metal may be a mixture of two, three, four, five, or even six promoter metals. For the case of two promoter metals, such as Ni and Co, the precursor will have the formula $[(Ni_bCo_{1-b})L](Mo_yW_{1-y}O_4)$ where $0<b<1$, and so on for the case where 3, 4, 5 or 6 promoter metals are present. Since the molybdate or tungstate and promoter metals are all present in a single complex compound, catalyst prescursors of this type may be called self-promoted molybdates, tungstates, or combinations thereof. If it is a molybdate, then y will have a value of 1. Alternatively, if the precursor is tungstate, y will be zero.

The ligand L, will generally have a denticity of six and will be one or more neutral, nitrogen-containing ligands wherein at least one of said ligands, is a multi-dentate chelating ligand which chelates the promoter metal to form a chelated promoter metal cation $[ML]^{2+}$. Thus, the catalytic metal oxide anion $(Mo_yW_{1-y}O_4)^{2-}$ will be ionically bound to the chelated promoter metal cation $[ML]^{2+}$. By neutral is meant that the ligand itself does not have a charge.

Those skilled in the art know that the term "ligand" is used to designate functional coordinating groups which have one or more pairs of electrons available for the formation of coordinate bonds. Ligands that can form more than one bond with a metal ion are called polydentate while ligands that can form only one bond with a metal ion are called monodentate. Monodentate ligands are not capable of forming chelates. Hence, if one uses one or more species of monodentate ligands in the precursor compound, then one must also use at least one polydentate chelating ligand. Preferably, L will be one or more polydentate chelating ligands. The denticity of the ligand L will generally be six, because the promoter metal cations prefer six-fold coordination. Hence, if more than one species of ligand is employed in the precursor compound, the denticity of the ligand species will usually add up to six. It should be understood that it is possible for ligand L to have a total denticity of less than six, but in most cases L will have a total denticity of six. Thus, as illustrative examples, L will be three bidentate ligands, two tridentate ligands, a mixture of a bidentate and a quadridentate ligand, a hexadentate ligand or a mixture of a polydentate ligand with monodentate ligands, as long as the combination has a total denticity of six. As has heretofore been stated, it is preferred to use chelating bidentate and tridentate ligands. In general, the ligands useful in this invention include alkyl and aryl amines and nitrogen heterocycles. Illustrative, but non-limiting examples of ligands useful in the catalyst precursors of this invention are set forth below.

Monodentate ligands will include $NH_3$, as well as alkyl and aryl amines such as ethyl amine, dimethyl amines, pyridine, etc. Useful chelating bidentate amine ligands are illustrated by ethylenediamine, 2,2'-bipyridine, 1,10-phenylene bis(dimethyl-amine), o-phenylene diamine, tetramethylethylenediamine and propane-1,3 diamine. Similarly, useful chelating tridentate amine ligands are represented by terpyridine and diethylenetriamine while triethylenetetramine is illustrative of a useful chelating quadradentate amine ligand. Useful chelating pentadentate ligands include tetraethylenepentamine while sepulchrate (an octazacryptate) is illustrative of a suitable chelating hexadentate ligand. However, as a practical matter, it will be preferred to use chelating, polydentate alkyl amines for L. Illustrative, but not limiting examples of alkyl amines that are useful in the catalyst precursor of this invention include ethylenediamine, diethylenetriamine, and tetraethylenetetramine. It is particularly preferred to use bidentate and tridentate alkyl amines such as ethylenediamine and diethylenetriamine.

In general, the precursor salts, metal amine metallates, useful for forming the catalysts of this invention and which are represented by the aforementioned formula when M is not Cr, may be prepared by mixing an aqueous solution of ammonium molybdate and/or tungstate with an aqueous solution of chelated promoter metal cation, for example, $[ML]^{2+}$ which, in the presence of excess metallate, ligand and/or chelated promoter metal cation, will result in the formation of the precursor salt as a precipitate which is readily recovered. The chelating promoter cation is easily formed by, for example, mixing an aqueous solution of one or more water soluble promoter metal salts with the ligand or mixture of ligands. The water soluble salt may be any water soluble salt that is convenient to use. Non-limiting examples of such salts include halides, sulfates, prechlorates, acetates, nitrates, etc. Alternatively, an aqueous solution of ammonium molybdate and/or tungstate may be mixed with the ligand with the resulting solution mixed with an aqueous solution of promoter metal salt. The salt can also be added to the ligand and dissolved into the solution of molybdate and/or tungstate. It should be understood that the catalyst precursor preparation is not intended to be limited to aqueous media.

When the composition of the present invention contains chromium, two different procedures can be used for the precursor preparation. In one procedure, the chromium containing precursor is prepared by mixing a slurry of (i) a hydrated oxide of trivalent chromium $Cr(OH)_3 \cdot xH_2O$ with (ii) one or more of the promoter metal and ligand containing metallate salts and, optionally, (iii) one or more metallate salts of Mo and/or W containing the conjugate acid of one or more ligands, but no divalent promoter metal. The metallate salt is then precipitated onto the slurried particles of hydrated chromium oxide and the precursor is recovered. The hydrated chromium oxide may be freshly precipitated from an aqueous solution of a trivalent chromium salt. Alternatively, the source of hydrated chromic oxide may be a colloidal, aqueous suspension of same. In one method of preparation the hydrated chromium oxide will be precipitated from an aqueous solution of trivalent chromium salt by contacting said salt solution with one or more basic amine chelating agents.

In one embodiment, a water soluble trivalent chromium compound and divalent metal salt are dissolved in water and hydrated chromium oxide is precipitated by addition of a ligand, L, or a mixture of ligands, L. This procedure produces a slurry or suspension of very fine particles of a hydrated oxide of trivalent chromium in the aqueous phase, which also contains some free ligand L, and some of the conjugate acid of the ligand L, L'. When the conjugate acid is a strong acid, that is, if the ligand L is a weak base, then a quantity of ammonium hydroxide may be added to precipitate the chromium. The water soluble chromium salt may be any water soluble salt that is convenient to use such as halide, sulfate, nitrate, etc. Sufficient ligand L is added to form the water soluble chelated promoter metal cations $[ML]^{2+}$. This suspension of hydrated chromium oxide containing $[ML]^{2+}$ in solution is then mixed with a solution of the metallate prepared by dissolving ammonium metallate in an excess of the ligand or mixture of ligands. A small amount of water may be added if desired. On mixing the slurry with the metallate solution, a precipitate of the catalyst precursor forms which is recovered by filtration. This precipitate will be a precursor of a composition of this invention. Any step of this preparation may be done in the presence of a slurry of support material. If the chromia is present in sufficient amount, then the excess will serve as all or a portion of the support.

In another embodiment, the metallate salts $(ML)Mo_yW_{1-y}O_4$ and $(L')(Mo_yW_{1-y}O_4)$ may be prepared separately and mixed separately or together with the hydrated chromium oxide slurry prepared as described above. Again, this may be done in the presence of a slurry of support material. If the chromia is present in sufficient amount, then the excess chromia will comprise all or a portion of the support.

The salts $(L')(Mo_yW_{1-y}O_4)$ may generally be prepared by dissolving the ammonium metallate in excess of the ligand L. The salt is recovered as a precipitate by addition of water or some other suitable antisolvent such as methanol or acetone. If desired, these salts may be formed in the presence of one or more precursor materials as well as in the presence of one or more support materials. This procedure and precursor have more fully been discussed in U.S. Pat. No. 4,831,002 which is incorporated herein by reference.

The second way chromium-containing precursor compositions can be prepared is by mixing a solution of an appropriate metallate such as ammonium molybdate and/or tungstate in a mixture of ligand(s) L and water with an aqueous solution of the chelated promoter metal cation, containing trivalent chromium $[Cr_{1-z}M_zL_x]^{2n+}$, which results in the formation of the precursor compound as a precipitate which is readily recovered. The chelated, trivalent chromium containing cation is formed under anhydrous conditions by dissolving a soluble salt of trivalent chromium, such as $CrCl_3$, in an appropriate ligand or ligand mixture at low temperatures (i.e., 0° C.). When this solution is warmed up to ambient temperature, the chelating reaction occurs and the chelated salt precipitates. The product can be filtered, washed with methanol and dried for subsequent use. The chelated divalent metal promoter cation is easily formed by, for example, mixing an aqueous solution of one or more water soluble promoter metal salts with the ligand. The water soluble salt may be any water soluble salt that is convenient to use such as a halide, sulfate, perchlorate, acetate, nitrate, etc. While the chelated salts are generally water soluble, they can be precipitated from their aqueous solutions by the addition of methanol, filtered and washed with methanol, and dried. For example, solid $Ni(en)_3Cl_2$ can be prepared by adding ethylenediamine (en) to an aqueous solution of $NiCl_2 \cdot 6H_2O$, adding methanol to precipitate the chelate, washing with methanol and drying.

The anhydrously prepared chelated chromium cation salt is dissolved in water along with the chelated divalent promoter salt. The ammonium metallate solution is mixed with this solution containing the chelated promoters, resulting in the precipitation of the catalyst precursor. This procedure and precursor are more fully discussed in U.S. Pat. No. 4,831,002 which is incorporated herein by reference.

The difference in the method of preparing the chelated chromium promoter cation from the chelated divalent metal promoter cations is the fact that chromium chelation is slow compared to that of the divalent ions. As a result, the addition of the basic ligand to an aqueous chromium salt solution will result in the formation predominantly of hydrated chromium oxide instead of the chelate $(CrL)Cl_3$. To avoid this hydrated oxide formation, the chromium chelation is carried out under anhydrous conditions by adding the trivalent chromium salt to the dry ligand. One can prepare the divalent promoter metal chelates in the same manner, either separately or along with the trivalent chromium chelates.

The following examples, which illustrate the improved performance of the instant catalyst, are illustrative and not limiting.

The activity tests were conducted in an automated fixed-bed unit consisting of two independent upflow reactors in a common sand bath. Each reactor was equipped with a calibrated feed burette, a pump, a gas-liquid separator, and a product liquid collector. The reactor was made of a ⅜-inch ID 316 stainless steel pipe. The reactor pressure, temperature and hydrogen flow rate were all controlled by a computer. The catalyst particles were crushed and sized to 20–40 mesh granules to ensure adequate particle to reactor diameter ratios in the activity tests. Each reactor was packed with 10 cc of catalyst in the central zone and inert materials in the fore and aft zones. The attainment of isothermal conditions was indicated by temperature measurement across the bed with four equally spaced thermocouples.

The feed contains 7.2 wt % 2-methylnaphthalene and 0.05 wt.% $CS_2$, with the balance being hexadecane. The reaction conditions were 3.15 MPa, 1.0 LHSV, 1000 SCF/BBL, and 260° C. The liquid products were quantified on an HP gas chromatograph. The hydrogenation proceeds as follows:

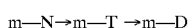

where m—N, m—T, and m—D denote methylnaphthalene, methyltetralins, and methyldecalins, respectively.

The preparation of the catalyst precursor $Ni_{0.5}Mn_{0.5}Mo(en)_3MoO_4$ (en is ethylene diamine) used in this work has been detailed elsewhere (U.S. Pat. Nos. 4,595,672 and 4,902,404). The corresponding deposited catalysts were prepared in accordance with the following illustrative examples.

EXAMPLE 1

In this example, $\gamma$-$Al_2O_3$ was used to deposit $Ni_{0.5}Mn_{0.5}$ (en)$_3MoO_4$. The catalyst, designated as $NiMnMo/Al_2O_3$, was prepared as follows: 15 g of $\gamma$-$Al_2O_3$ power were added to a solution containing 27 ml water and 43 ml ethylenediamine. This mixture was heated at 105° C. for two hours and then cooled to 4° C. under nitrogen. While stirring under nitrogen at 4° C., to this mixture was added a solution containing 9.56 g ammonium paramolybdate $(NH_4)_6Mo_7O_{24} \cdot 4H_2O$, 22 ml ethylenediamine, and 1 ml water. Separately, 6.45 g $NiCl_2 \cdot 6H_2O$ and 5.37 g $MnCl_2 \cdot 4H_2O$ were dissolved in 87 ml methanol. The resulting solution was then added slowly to the Mo-containing slurry at 4° C. under a blanket of nitrogen while stirring with a mechanical stirrer for one hour. The resulting mixture was allowed to settle until it reached room temperature. The deposited catalyst precursor was recovered by vacuum filtration under nitrogen and then dried under nitrogen at room temperature.

EXAMPLE 2

A highly stable basic oxide $Mg_{0.77}Al_{0.15}O$, prepared from a hydrotalcite precursor, was used to deposit $Ni_{0.5}Mn_{0.5}(en)_3MoO_4$. This oxide was prepared from calcining $Mg_5Al(OH)_{12}(CO_3)_{0.5} \cdot nH_2O$ in air at 600° C. for three hours. The catalyst, designated as $NiMnMo/Mg_{0.77}Al_{0.15}O$, was prepared as follows: 16 g of $Mg_{0.77}Al_{0.15}O$ powder were added to a solution containing 30 ml water and 92 ml ethylenediamine. This mixture was heated at 105° C. for two hours and then cooled to 4° C. under nitrogen. While stirring under nitrogen at 4° C., to this mixture was added a solution containing 10.7 g ammonium paramolybdate $(NH_4)_6Mo_7O_{24} \cdot 4H_2O$, 23 ml ethylenediamine, and 1 ml water. Separately, 7.0 g $NiCl_2 \cdot 6H_2O$ and 5.7 g $MnCl_2 \cdot 4H_2O$ were dissolved in 92 ml methanol. The resulting solution was then added slowly to the Mo-containing slurry at 4° C. under a blanket of nitrogen while stirring with a mechanical stirrer for one hour. The resulting mixture was allowed to settle until it reached room temperature. The deposited catalyst precursor was recovered by vacuum filtration under nitrogen and then dried under nitrogen at room temperature.

EXAMPLE 3

In this example, amorphous $SiO_2$—$Al_2O_3$ (87 wt % $SiO_2$, 13 wt % $Al_2O_3$) was used to deposit $Ni_{0.5}Mn_{0.5}(en)_3MoO_4$. The catalyst, designated as $NiMnMo/SiO_2$—$Al_2O_3$, was prepared as follows: 25 g of $SiO_2$—$Al_2O_3$ powder (Davison MS 13, precalcined at 600° C. for three hours) were added to a solution containing 45 ml water and 143 ml ethylenediamine. This mixture was heated at 105° C. for two hours and then cooled to 4° C. under nitrogen. While stirring under nitrogen at 4° C., to this mixture was added a solution containing 15.91 g ammonium paramolybdate $(NH_4)_6Mo_7O_{24} \cdot 4H_2O$, 35 ml ethylenediamine, and 1 ml water. Separately, 10.91 g $NiCl_2 \cdot 6H_2O$ and 8.86 g $MnCl_2 \cdot 4H_2O$ were dissolved in 144 ml methanol. The resulting solution was then added slowly to the Mo-containing slurry at 4° C. under a blanket of nitrogen while stirring with a mechanical stirrer for one hour. The resulting mixture was allowed to settle until it reached room temperature. The deposited catalyst precursor was recovered by vacuum filtration under nitrogen and then dried under nitrogen at 100° C.

EXAMPLE 4

In this example, a rare earth modified $SiO_2$—$Al_2O_3$ containing 9 wt % $Y_2O_3$ was used to deposit the precursor. This weakly acidic oxide was prepared by impregnating 455 g $SiO_2$—$Al_2O_3$ (Davison MS 25, precalcined at 600° C.) with a solution containing 152.6 g $Y(NO_3)_3 \cdot 6H_2O$ and 225 ml water. The impregnation was carried out by incipient wetness, followed by drying at 110° C. and subsequently calcination in air at 500° C. for three hours. The thus prepared $Y_2O_3$ modified $SiO_2$—$Al_2O_3$ was then used to deposit $Ni_{0.5}Mn_{0.5}(en)_3MoO_4$. The catalyst, designated as $NiMnMo/Y_2O_3$—$SiO_2$—$Al_2O_3$, was prepared as follows: 25 g $Y_2O_3$—$SiO_2$—$Al_2O_3$ powder were added to a solution containing 45 ml water and 143 ml ethylenediamine. This mixture was heated at 105° C. for two hours and then cooled to 4° C. under nitrogen. While stirring under nitrogen at 4° C., to this mixture was added a solution containing 15.91 g ammonium paramolybdate $(NH_4)_6Mo_7O_{24} \cdot H_2O$, 36.5 ml ethylenediamine, and 1 ml water. Separately, 10.91 g $NiCl_2$—$6H_2O$ and 8.86 g $MnCl_2$—$4H_2O$ were dissolved in 144 ml methanol. The resulting solution was then added slowly to the Mo-containing slurry at 4° C. under a blanket of nitrogen while stirring with a mechanical stirrer for one hour. The resulting mixture was allowed to settle until it reached room temperature. The deposited catalyst precursor was recovered by vacuum filtration under nitrogen and then dried under nitrogen at room temperature.

EXAMPLE 5

The following nonlimiting examples provide the aromatics hydrogenation data on the deposited MAM catalysts prepared above. Prior to use, the precursor compounds were sulfided with a 10% $H_2S$-in-$H_2$ gas mixture at 360° C. for three hours.

Summarized in Table 1 are the performance data. Note that what is presented in Table 1 are raw data, so the material balances are not 100%.

As can be seen, the yttria treated catalyst exhibited a behavior closely mimicing the bulk catalyst. However, only 30 wt. % of the complex was necessary when a support as taught by the instant invention was utilized to maintain the high activity of the metal amine metallate-derived catalysts. Evidently, inorganic refractory oxide modified by a rare earth oxide or yttria greatly enhances the metal utilization.

TABLE 1

Hydrogenation Data for Different Dispersed $Ni_{.5}Mn_{.5}Mo$ Sulfides
COMPOSITION OF REACTION PRODUCTS, WT %

| Oxide Support | m-N | m-T | M-D |
|---|---|---|---|
| None | — | 4.0 | 3.2 |
| $Al_2O_3$ | — | 6.9 | 0.2 |
| $Mg_{.77}Al_{.15}O$ | — | 6.3 | 1.0 |
| $SiO_2$—$Al_2O_3$ | — | 5.6 | 1.6 |
| $9\%Y_2O_3$—$SiO_2$—$Al_2O_3$ | — | 4.6 | 2.5 |

What is claimed is:

1. An improved aromatics hydrogenation process comprising contacting an aromatics hydrogenation feed stream, under aromatics hydrogenation conditions, with a catalyst composition prepared by the process comprising:
   (a) impregnating an oxide precursor selected from the group consisting of rare earth oxide precursors, yttria precursors and mixtures thereof, onto an inorganic refractory oxide support;
   (b) activating said support; and
   (c) compositing or depositing on said support of step (b), a catalyst precursor salt represented by $(ML)(Mo_yW_{1-y}O_4)a$ wherein M comprises Cr and/or one or more divalent promoter metals selected from the group consisting of Mn, Fe, Co, Ni, Cu, Zn and mixtures thereof, wherein y is any value ranging from 0 to 1, and wherein L is one or more neutral, nitrogen-containing ligands at least one of which is a chelating polydentate ligand; a=1 when chromium is not one of the promoter metals and $0.5 \leq a \leq 3$ when Cr is one of the promoter metals;
   (d) sulfiding said deposited or composited supports of step (c) with an excess amount of sulfur in the form of one or more sulfur bearing compounds and at a temperature of at least about 250° C. to form catalysts.

2. A process according to claim 1 wherein said support of step (c) is decomposed in a non-oxidizing atmosphere at a temperature of at least 250° C. prior to said sulfiding step (d).

* * * * *